(12) United States Patent
Smit

(10) Patent No.: US 9,055,159 B2
(45) Date of Patent: Jun. 9, 2015

(54) MOBILE COMMUNICATION DEVICE AND METHOD FOR SELECTIVELY TURNING ON AN ADDITIONAL WIRELESS TRANSCEIVER

(76) Inventor: Raymond Maurice Smit, Geldrop (NL)

( * ) Notice: Subject to any disclaimer, the term of this patent is extended or adjusted under 35 U.S.C. 154(b) by 121 days.

(21) Appl. No.: 13/515,574

(22) PCT Filed: Dec. 14, 2009

(86) PCT No.: PCT/NL2009/050763
§ 371 (c)(1),
(2), (4) Date: Aug. 8, 2012

(87) PCT Pub. No.: WO2011/074943
PCT Pub. Date: Jun. 23, 2011

(65) Prior Publication Data
US 2013/0035049 A1    Feb. 7, 2013

(51) Int. Cl.
  *H04B 7/00*     (2006.01)
  *H04M 1/60*    (2006.01)
  *H04M 1/73*    (2006.01)
  *H04W 52/02*   (2009.01)

(52) U.S. Cl.
  CPC ........... *H04M 1/6091* (2013.01); *H04B 1/3822* (2013.01); *H04B 2001/3866* (2013.01); *H04M 1/73* (2013.01); *H04M 2250/02* (2013.01); *H04M 2250/06* (2013.01); *H04M 2250/10* (2013.01); *H04M 2250/12* (2013.01); *H04W 52/0254* (2013.01)

(58) Field of Classification Search
  CPC ..... H04W 36/32; H04W 76/02; H04W 36/08; H04W 36/18; H04W 48/20; H04W 64/006; H04W 76/04; H04W 8/22

USPC .................. 455/441, 444, 552.1, 553.1, 569.2
  See application file for complete search history.

(56) References Cited

U.S. PATENT DOCUMENTS

| | | | |
|---|---|---|---|
| 6,934,547 B2 * | 8/2005 | Suzuki ........................ | 455/441 |
| 7,082,304 B2 * | 7/2006 | Wakabayashi ................ | 455/441 |
| 7,620,401 B2 * | 11/2009 | Oh ................................ | 455/441 |
| 8,064,903 B2 * | 11/2011 | Pathan et al. ............... | 455/432.1 |
| 2001/0044306 A1 * | 11/2001 | Shimono et al. ............. | 455/441 |
| 2004/0038683 A1 * | 2/2004 | Rappaport et al. ........... | 455/446 |

(Continued)

FOREIGN PATENT DOCUMENTS

WO    2009/013573 A1    1/2009

OTHER PUBLICATIONS

International Search Report, dated May 3, 2010, from corresponding PCT application.

*Primary Examiner* — Lewis West
(74) *Attorney, Agent, or Firm* — Young & Thompson

(57) ABSTRACT

A mobile communication device includes a main wireless transceiver unit for sending and receiving wireless signals, an additional wireless transceiver unit for sending and receiving wireless signals, a motion detection unit, connected to a processing unit and arranged to send a motion signal to a processing unit, and the processing unit, arranged to receive the motion signal and to determine therefrom a parameter representative of a velocity of the mobile communication device, wherein the processing unit is arranged and constructed to turn on the additional wireless transceiver unit when the parameter exceeds a first threshold value. Furthermore, the processing unit is arranged and constructed to turn off the additional wireless transceiver unit when the parameter representative of a velocity remains below a second threshold value for a predetermined period of time.

17 Claims, 2 Drawing Sheets

(56) References Cited

U.S. PATENT DOCUMENTS

| | | | |
|---|---|---|---|
| 2004/0077346 A1* | 4/2004 | Krenik et al. | 455/426.2 |
| 2005/0048977 A1* | 3/2005 | Dorenbosch et al. | 455/441 |
| 2005/0282588 A1 | 12/2005 | Linjama et al. | |
| 2006/0135150 A1* | 6/2006 | Oh | 455/425 |
| 2007/0072553 A1 | 3/2007 | Barbera | |
| 2009/0132197 A1 | 5/2009 | Rubin et al. | |

* cited by examiner

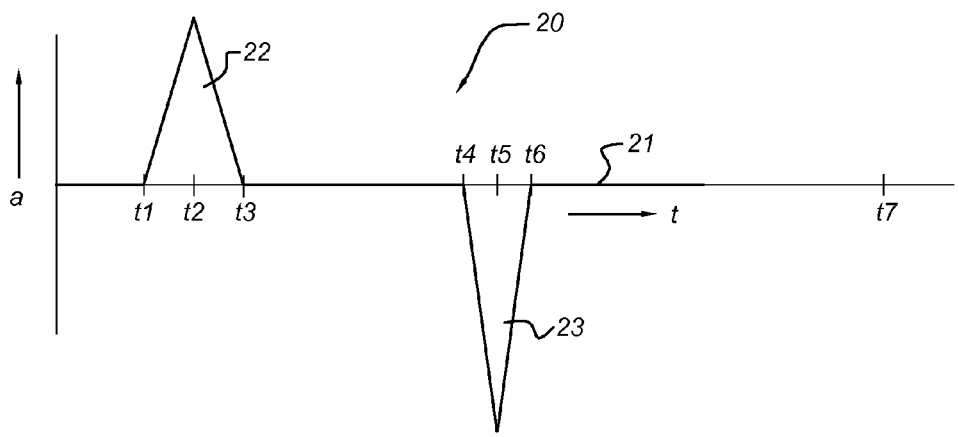
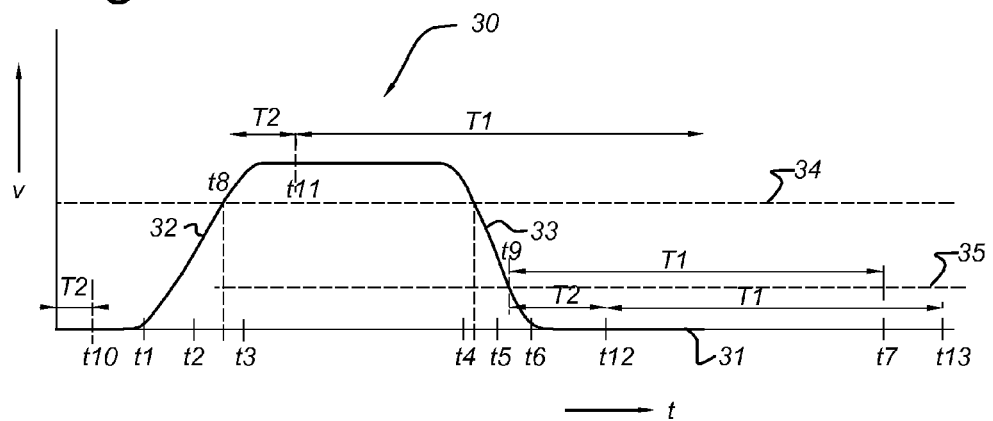
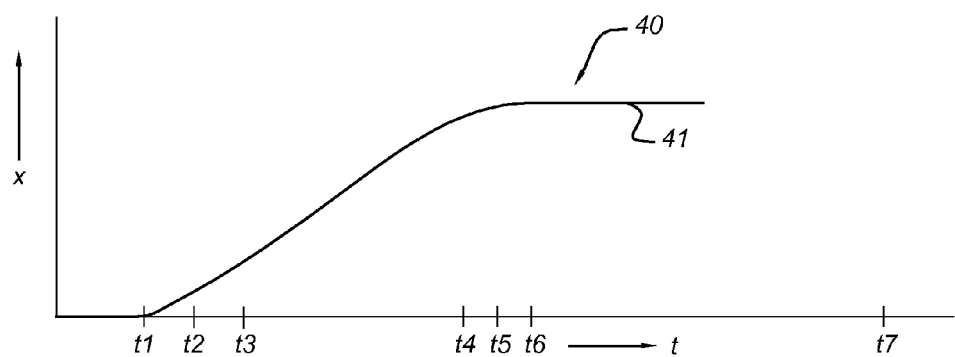

MOBILE COMMUNICATION DEVICE AND METHOD FOR SELECTIVELY TURNING ON AN ADDITIONAL WIRELESS TRANSCEIVER

BACKGROUND OF THE INVENTION

1. Field of the Invention

The invention relates to a mobile communication device comprising a main wireless transceiver unit and an additional wireless transceiver unit for sending and receiving wireless signals.

2. Description of the Related Art

In addition to a main wireless transceiver unit, which may for example be a Radio Frequency (RF) unit intended for voice and data communications over a mobile telephony network, many modern mobile devices come equipped with one or more additional wireless transceiver units, for example a Bluetooth transceiver. Such an additional wireless transceiver unit may be used to connect to peripheral devices, for example to a wireless headset unit or a so-called hands-free car-kit. These additional transceivers typically consume electrical power from the mobile device's battery, even if they are not currently actively exchanging data.

One way to reduce the average power usage is by manually turning on or off the additional wireless transceiver unit depending on whether it is needed. In particular, a Bluetooth transceiver of a mobile communication device may be turned on manually by a user when he steps into his car, so that the mobile communication device can connect to the Bluetooth based headset or hands-free car kit. The user should then turn off the transceiver when he leaves the car in order to preserve battery power. This is an inconvenient and error-prone method. If the user forgets to turn on or off the transceiver, the method fails without warning. In particular, if the user forgets to turn on the transceiver and he receives an incoming call while driving, a dangerous situation can ensue when he does attempt to answer the call without using the car kit.

BRIEF SUMMARY OF THE INVENTION

It is an object of this invention to reduce the amount of electrical power required by the additional wireless transceiver unit with less inconvenience for the user of the communication device. Furthermore, it is an object of this invention to provide a more convenient way for the user of a mobile communication device to enable or disable the functionality of additional wireless transceiver units of the device.

At least an object is met by providing a mobile communication device, the device comprising:
- a main wireless transceiver unit for sending and receiving wireless signals,
- an additional wireless transceiver unit for sending and receiving wireless signals,
- a motion detection unit, connected to a processing unit and arranged to send a motion signal to a processing unit, and
- the processing unit, arranged to receive the motion signal and to determine therefrom a parameter representative of a velocity of the mobile communication device, wherein the processing unit is arranged and constructed to turn on the additional wireless transceiver unit when the parameter exceeds a first threshold value.

When the parameter representative of a velocity exceeds the threshold value, available e.g. from a suitable memory connected to the processing unit, representative of a threshold velocity, it is assumed that the device is in a moving vehicle, and thus the processing unit will turn on the additional wireless transceiver unit to make contact with a wireless headset or car-kit. Up to that point, the additional wireless transceiver unit could remain turned off and thus consumed no electrical power. In an embodiment the default mode of the additional wireless transceiver unit is off.

The parameter representative of the velocity is obtained from a motion signal provided by the motion detection unit. The motion signal and motion detection unit according to this description allow determining a positional relation between the mobile communication device and the world. Examples are relative position, relative speed, relative acceleration. As the motion detection unit is part of the mobile communication device, it allows determining the relative motion of the device in the world.

Some motion detection units are arranged to determine a motion signal that is already representative of a velocity of the mobile communication device. In that case, the motion signal and the parameter representative of a velocity may be substantially identical, and the processing unit need not be arranged to determine the parameter from the motion signal.

In an embodiment according the invention, the processing unit is arranged and constructed to turn off the additional wireless transceiver unit when the parameter representative of a velocity remains below a second threshold value for a predetermined period of time. Automatically turning off the transceiver unit when it appears the user is no longer in a moving vehicle and thus no longer in need of a wireless connection with a headset or car-kit, advantageously can save battery power. It is advantageous to wait a while after the velocity has dropped below the threshold value before the additional wireless transceiver unit is turned off, in order to prevent an erroneous turning off due to for example an error in the determination or processing of the motion data.

In an embodiment according the invention, the processing unit is arranged and constructed to send a signal to a user of the mobile communication device prior to turning on the additional wireless transceiver unit. In an embodiment according the invention, the processing unit is arranged and constructed to send a signal to a user of the mobile communication device prior to turning off the additional wireless transceiver unit. The signal can advantageously inform the user about the type of motion that is detected. It may also serve as a reminder for the user that the device is arranged to automatically turn on or off the additional wireless transceiver unit based on the device's motion.

In an embodiment according the invention, the processing unit is arranged and constructed to request a user of the mobile communication device to accept or deny turning on the additional wireless transceiver. The processing unit is arranged to cancel turning on the additional wireless transceiver unit if the user denies the request. As such, the device, in particular the processing unit, is arranged to perform a confirmation procedure or enable procedure prior to turning on the additional wireless transceiver. This advantageously allows a user to override the automatic enabling action in case it is undesired.

In an embodiment according the invention, the processing unit is arranged and constructed to request a user of the mobile communication device to accept or deny turning off the additional wireless transceiver unit. The processing unit is arranged to cancel turning off the additional wireless transceiver unit if the user denies the request. As such, the device, in particular the processing unit, is arranged to perform a confirmation procedure or disable procedure prior to turning off the additional wireless transceiver. This advantageously allows a user to override the automatic disabling action in case it is undesired. The device may be configured to interpret an ignored request by default as an acceptation or as a denial of the request.

In an embodiment according the invention, the motion detection unit comprises an accelerometer. An accelerometer is a standard component in many mobile communication devices, and can be advantageously used to determine a motion signal representative of acceleration. In an embodiment the accelerometer determines a sustained, i.e. exceeding a threshold value, acceleration for a period of time, for example an acceleration of at least 1 G during 1 second. This will allow the processor to determine that the mobile communication device is now travelling at an at least 9.8 m/s higher velocity, e.g. travelling in a car.

In an embodiment the communication device comprises at least three accelerometers allowing three dimensional observation of the motion. The combined signals can be converted to a motion signal either in the motion detection unit or in the processor. This allows detection of relative movement of the device in any direction of the device with respect to the world.

In an embodiment according the invention, the motion detection unit comprises a Global Positioning System (GPS) location unit. A GPS unit is also a standard component in many mobile communication devices. It can advantageously be used to determine a motion signal.

In an embodiment according the invention, the additional wireless transceiver unit comprises a Bluetooth unit. It is advantageous to turn on and off the Bluetooth unit depending on the type of motion, since many car kits or headsets for use in a vehicle connect to a mobile communication device via Bluetooth.

In an embodiment according the invention, the additional wireless transceiver unit comprises a WiFi unit. This allows connecting to a hub, allowing data communication e.g. with a headset.

In an embodiment according the invention, the first or second threshold value is at least 20 kilometers per hour, or at least 30 kilometers per hour, or at least 40 kilometers per hour. Velocities of at least 20 kilometers per hour, particular in combination with a lack of significant acceleration or deceleration for a certain amount of time, are typical for motorized vehicles.

In an embodiment according the invention, the mobile communication device further comprising a microphone unit, a speaker unit, and a coder/decoder (codec) unit, the codec unit being arranged to receive a voice signal from the microphone unit and to generate a coded voice data signal therefrom for sending via the main transceiver unit, and the codec unit being arranged to receive coded voice data from the main transceiver unit, and to generate therefrom a voice signal for rendering on the speaker unit. In an embodiment according the invention, the mobile communication device is arranged to function as a mobile telephone. By nature, a mobile telephone is a device that a user takes with him almost everywhere, with the main wireless transceiver unit being almost always enabled. The additional wireless transceiver unit is often only useful in specific conditions, for example in the user's car. Hence, the invention is advantageously applied to a mobile telephone device.

In an embodiment the (additional) transceiver is turned off when the parameter exceeds a second threshold value. This allows the turning off of transceivers at e.g. a second higher speed of the mobile communication device with respect to the earth. The second speed can be e.g. 500 km/h. If this occurs, the mobile communication device is in an airplane and the transceiver should be turned off. In accordance to this embodiment the transceivers are turned off.

In an embodiment the mobile communication device comprises a dedicated circuit for executing the functionality according to the invention. In another embodiment the central processor unit of the mobile communication unit is used a processor.

In an embodiment at least two motion detection unit are provided in the mobile communication device. A first motion detection unit can comprise a low energy consumption motion detection unit. In a default mode the first motion detection unit is on and allows detection of a movement of the mobile communication device. If a movement is detected, the second, a more energy consuming and more accurate motion detection unit is turned on, in order to determine a motion signal to be sent to the processor for allowing determining a parameter representative of a velocity. In accordance with this embodiment a crude movement detection is on in a default mode, while the more accurate detection is performed only if a crude motion is detected. This will further save battery power.

According to another aspect of the invention at least an object is achieved by providing a mobile communication device, the device comprising a wireless transceiver unit for sending and receiving wireless signals, a motion detection unit, connected to a processing unit and arranged to send a motion signal to a processing unit, and the processing unit, arranged to receive the motion signal and to determine therefrom a parameter representative of a velocity of the mobile communication device, wherein the processing unit is arranged and constructed to turn on the wireless transceiver unit when the parameter exceeds a first threshold value. Such an arrangement is for example a laptop computer having a WiFi transceiver. Said transceiver is turned off, but is automatically turned on when a threshold value representative of a minimum speed is determined, corresponding to a situation in which the laptop's position is in a moving train, said train having a wireless access point and the invention therefore allowing automatic connection to the access point.

In an embodiment the threshold value can be a pattern. In an embodiment the parameter is the acceleration and the time pattern of the determined acceleration is compared with a predetermined acceleration pattern. In an embodiment the pattern corresponds with a acceleration pattern of a train. If such an acceleration pattern is determined, the (additional) transceiver is turned on.

The invention further provides a method for selectively turning on an additional wireless transceiver unit of a mobile communication device, the method comprising:
  determining a signal indicative of the motion of the mobile communication device,
  determining a parameter representative of a velocity of the mobile communication device therefrom,
  turning on the transceiver unit if the parameter exceeds a threshold value.

In case the signal indicative of the motion of the mobile communication device is already a parameter representative of a velocity, the signal and the parameter may be substantially identical, and the step of determining the parameter from the signal may be a trivial operation or be skipped altogether.

In an embodiment according the invention, the method further comprises:
  turning off the transceiver unit if the parameter representative of a velocity remains below a second threshold value for a predetermined amount of time.

In an embodiment according the invention, the method further comprises:

requesting permission from the user to turn on or turn off the additional wireless transceiver unit, and cancelling the step of turning on or turning off the additional wireless transceiver unit if the user denies the request.

According to a further aspect a program is provided that, when executed on a processor of a mobile communication device, allows functioning of the mobile communication device in accordance to the method.

Further a data carrier is provided comprising such a program.

According to a different aspect a mobile communication device is provided comprising:

a (main or additional) wireless transceiver unit for sending and receiving wireless signals, a motion detection unit, connected to a processing unit and arranged to send a motion signal to a processing unit, and the processing unit, arranged to receive the motion signal and to determine therefrom a parameter representative of a velocity of the mobile communication device, wherein the processing unit is arranged and constructed to turn off the wireless transceiver unit when the parameter exceeds a second threshold value. Further a method can be provided for selectively turning off a (main or additional) wireless transceiver unit of a mobile communication device, the method comprising:

determining a signal indicative of the motion of the mobile communication device, determining a parameter representative of a velocity of the mobile communication device therefrom, turning off the transceiver unit if the parameter exceeds a second threshold value.

The second threshold value can be a value corresponding with a speed of at least 350 km/h. In such circumstances the transceiver should be turned off and in accordance to the provided device and method, it will be turned off automatically. A program can be provided allowing the device to function in accordance to this method, when executed by processor and a data carrier comprising such a program can be provided.

BRIEF DESCRIPTION OF THE FIGURES

FIGS. 2a-2c schematically show acceleration, velocity, and position signals.

DETAILED DESCRIPTION

Figure 1:
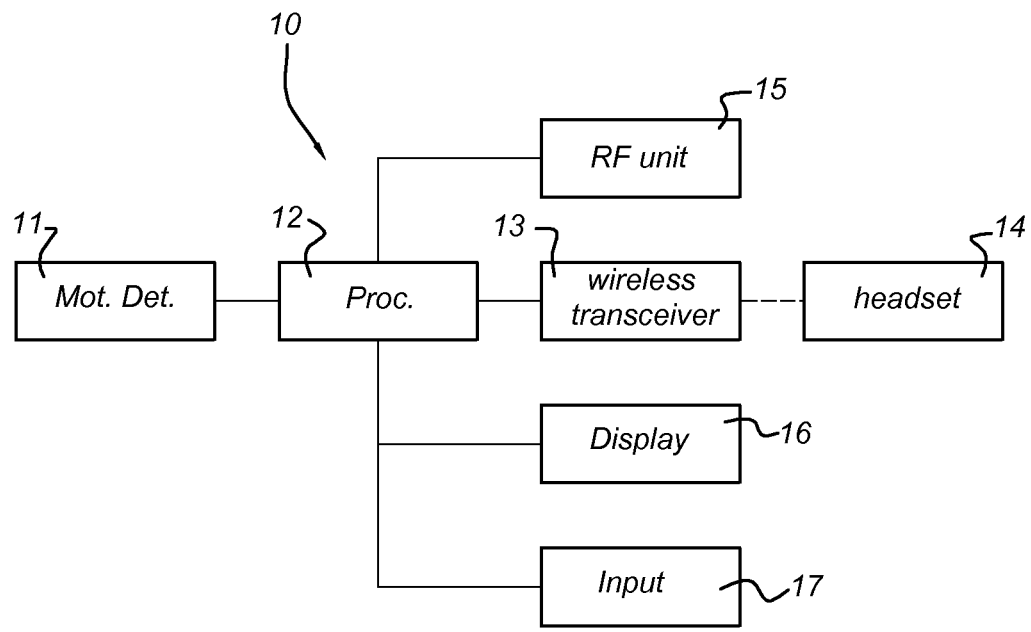
FIG. 1 schematically shows a mobile communication device according to the invention.

FIG. 1 schematically shows a mobile communication device 10 according to the invention, the device comprising a motion detection unit 11, a processing unit 12, an additional wireless transceiver unit 13, a main wireless transceiver unit (hereafter RF unit) 15, a display unit 16, and an input unit 17. Wirelessly connected to the additional wireless transceiver unit 13 is a headset 14.

The motion detection unit 11 is connected to the processing unit 12, and generates a motion signal which is sent to the processing unit 12. In the current example, the motion detection unit 11 comprises an accelerometer unit, and the motion signal is indicative of the acceleration of the mobile communication device as measured by the accelerometer unit. The motion detection unit 11 may also comprise a GPS unit.

The processing unit 12 is furthermore connected to the RF unit 15 for sending and receiving voice and control data, to the additional wireless transceiver unit 13 for sending and receiving general data, such as for example voice data, to and from a headset 14. The processing unit 12 is also connected to a display unit 16 for displaying information and an input unit 17 for receiving user input.

The additional wireless transceiver unit 13 can be used to exchange data with a peripheral device or a wireless network. In this example, the additional wireless transceiver unit 13 is a Bluetooth transceiver, which can for example exchange voice data with a Bluetooth headset 14. The Bluetooth headset 14 may be built into a car, as part of the car's Bluetooth based car-kit. Alternatively, the additional wireless transceiver unit 13 can be a Wifi or Wimax transceiver.

In this example, the RF unit 15 is a mobile communications compliant RF transceiver, such as is for example used in GSM telephones. The display unit 16 can be an Liquid Crystal Display (LCD) or Organic Light Emitting Diode (OLED) screen, possibly a touch-screen arranged to receive input from a user. The input unit 17 can be a keypad comprising keys combined with additional input controls such as a scroll wheel or buttons elsewhere on the mobile communication device. The input unit 17 can be used to enter telephone numbers, navigate and manipulate the device's user interface (UI), enter text messages, etc.

The wireless communication device 10 has a power source such as for example a rechargeable battery (not shown) from which units 11, 12, 13, 15, 16, and 17 draw power, when said units are enabled. Typically, when the device 10 is in the "on" state, the processing unit 12 is enabled, but the other units may be enabled or disabled depending on circumstances. Disabling a unit will disable part of the functionality of the device, but also reduce the required power from the power source.

In operation, the mobile communication device 10 functions as follows. By default, the additional wireless transceiver unit 13 is disabled, and the motion detection unit 11 and processing unit 12 are enabled. The other units are enabled or disabled depending on the active profile of the mobile communication device 10.

The motion detection unit 11 registers motion of the device and generates a motion signal, in this example a signal indicative of the device's acceleration. Other motion signals may be indicative of the device's velocity or position.

The motion signal is sent to the processing unit, which determines from the motion signal a parameter representative of a velocity of the device. In an embodiment, the motion signal itself is already representative of a velocity of the device, and the parameter is thus substantially identical to it. This parameter (hereafter velocity) may be an absolute velocity, with which is meant that the velocity is relative to the velocity of the earth's surface or "world", or a relative velocity, with which is meant that the velocity is relative to some arbitrary zero velocity. In an embodiment a parameter representative of a velocity may be obtained by averaging an acceleration over a period of time, or by determining a difference between positions measured on at least two different moments in time.

If the velocity of the device meets a certain criterion, for example, the velocity of the device exceeds a first threshold value, the processing unit registers that the device may be in a moving vehicle and will turn on the additional transceiver unit.

The processing unit will e.g. start an enable block or procedure. The enable block may be implemented as a software program to be run on the processing unit 12, or in dedicated hardware of the mobile communication device 10, or as a combination of hardware and software. The enable block causes the device 10 to display a message on the display, to produce an audible signal, or to generate any other kind of signal, the signal having the purpose to indicate that the device 10 has detected a significant amount of movement and requests to turn on the additional wireless transceiver unit 13. The user of the device can accept or deny that request, or do nothing for a predetermined amount of time. Depending on the configuration of the device, the enable block is arranged to interpret no reaction from the user as equivalent to accepting or denying the request. If the user accepts, the enable block is arranged to turn on the additional wireless transceiver unit 13.

If the additional wireless transceiver unit 13 is turned on, the unit will now attempt to make a Bluetooth connection with an external Bluetooth communication system, for example the Bluetooth communication system of a car, in the usual fashion.

If the velocity of the device meets a certain second criterion, for example, the velocity of the device remains below a second threshold value for a predetermined amount of time, the processing unit registers that the device may not or no longer be in a moving vehicle. The device 10, in particular the processing unit 12, will then start a disable block, which is implemented similarly to the enable block. The disable block is arranged to display a message on the display, to produce an audible signal, or to generate any other kind of signal to request turning off the additional wireless transceiver unit 13. Again, the user can accept, deny or ignore that request. In an example, the processing unit only starts the disable block if, in addition to meeting the second criterion or regardless of said criterion, there is no longer an active Bluetooth connection, for example due to the fact that the Bluetooth system of the car has been shut down, or the user with the device has walked out of range of the car's Bluetooth system.

Now the processing steps to convert a motion signal, such as an acceleration signal (from an accelerometer) or a position or velocity signal (from a GPS unit), into a velocity will be discussed in more detail in reference to FIGS. 2a-2c.

FIG. 2a shows a plot 20 of an acceleration signal 21, such as may be generated by an accelerometer of a motion detection unit 11, where the vertical axis represents acceleration (a) and the horizontal axis time (t). Up until time t1, there is no measured acceleration. From t1, the acceleration increases, peaks at time t2, then decreases to zero at time t3, thus forming an acceleration peak 22. A reverse, deceleration peak 23 occurs starting at time t4, with maximum deceleration or negative acceleration at t5, and ending at time t6. Note that the direction of positive acceleration can be arbitrary. Peak 22 may also be called a deceleration peak and peak 23 an acceleration peak.

FIG. 2b shows a plot 30 of a velocity signal 31, such as the parameter representative of a velocity that may be determined by the processing unit 12, which corresponds to the acceleration signal 21 of FIG. 2a. As is known, velocity change may be calculated by integrating acceleration over time. The vertical axis now represents velocity (v), the horizontal axis still represents time (t). Initially, the velocity is set to zero. The acceleration peak 22 causes a velocity increase 32, between times t1 and t3, with maximum slope at time t2. Between time t3 and t4 the velocity is constant, after which the deceleration peak 23 causes a drop to zero velocity between times t4 and t6.

Dashed line 34 indicates a first threshold velocity level. At time t8, between times t2 and t3, the velocity signal 31 exceeds the first threshold velocity 34. At time t9, between t5 and t6, the velocity signal 31 crosses the second threshold velocity 35, after this time remaining below the second threshold. The first or second threshold velocity can be for example 10 kilometers per hour, 20 kilometers per hour, or 40 kilometers per hour.

At time t8, the processing unit may start the enable block. A predetermined period of time T1 after time t9, for example at time t7, the processing unit may start the disable block. Time T1 can for example be 5 minutes, 10 minutes, or 15 minutes.

In the preceding explanation, it is implied that at the time before t1, the device is at rest with respect to the world, and the velocity is set to zero. An accelerometer as such cannot determine when a device is at rest with respect to the world, so a kind of calibration is necessary. For example, the device may calibrate the zero velocity when the device is in a known state (for example in a recharging/synchronizing cradle). Another example is that the motion detection unit may be arranged to determine a motion pattern characteristic of a person walking, for example the pattern of acceleration-deceleration of walking or jogging, and at that point calibrate the velocity as approximately zero.

Alternatively, the device can be arranged to work with velocities relative to an unknown zero velocity. For example, the velocity may be reset to zero if for a predetermined amount of time T2, no significant change in velocity is detected. Time T2 can be for example 10 seconds, 30 seconds, 1 minute, 2 minutes, 5 minutes, or longer.

In FIG. 2b, this would work out as follows. Initially, the velocity is undetermined. After amount of time T2, at time t10, the velocity is reset to zero. Between t1 and t3 the velocity change exceeds the threshold value 34, and the processing unit 12 will start the enable block at time t8, as before. After time t3, the velocity remains unchanged for a while. At amount of time T2 after t3, at time t11, the velocity is again reset to zero.

If the velocity would remain relatively constant, for example below second threshold value 35, for amount of time T1 after t11, the processing unit would then start the disable block. However, this does not happen since before amount of time T1 passes, the acceleration/deceleration peak 23 occurs. After time t6, the velocity again remains substantially constant and at time t12 is once again reset to zero. At time t13, an amount of time T1 after t12, the reset velocity signal not having exceeded threshold value 35, the processing unit 12 starts the disable block.

FIG. 2C shows a plot 40 of a position signal 41, such as may be determined by a motion detector comprising a GPS unit. The vertical axis now represents position (x). As is known, velocity is a time derivative of position, so the slope of position 41 corresponds to velocity 31. The processing unit 12 can thus derive velocity 31 by taking the time derivative of the motion signal of the motion detection unit 11. Alternatively, some GPS units are arranged to also calculate a velocity signal directly.

Figure 3:
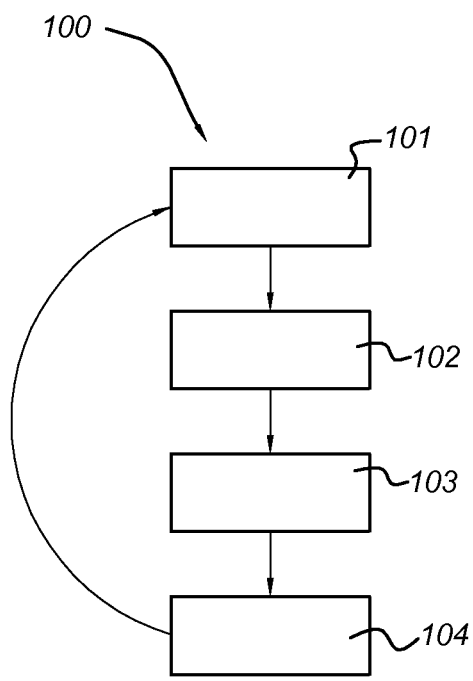
FIG. 3 schematically shows a flow chart of a method according to the invention.

FIG. 3 shows a flow diagram 100 of a method for turning on an additional wireless transceiver unit 13 of a mobile communication device 10.

In step 101 a signal indicative of the motion of the mobile communication device 10 is determined. For example, this signal may represent the current acceleration, position, or velocity of the device 10. In step 102, a parameter representative of a velocity with respect to some zero is determined from this signal. In step 103, the parameter (hereafter velocity) is compared to a first threshold velocity. If the first threshold is exceeded and the additional wireless transceiver unit is not already enabled, the additional wireless transceiver unit is turned on. In step 104, the velocity is compared to the first or a second threshold velocity, and if the velocity is below this threshold, and has been so for a predetermined amount of time T1, the additional wireless transceiver unit is turned off if it is not already turned off. After step 104, step 101 is repeated.

The step 103 may additionally comprise requesting the user to accept or deny turning on the wireless transceiver unit prior to doing so, and cancelling the step of turning on the wireless transceiver unit in case the user denies the request. No reaction from the user may be interpreted as either an acceptance or denial of the request.

The step 104 may additionally comprise requesting the user to accept or deny turning off the wireless transceiver unit prior to doing so, and cancelling the step of turning off the wireless transceiver unit in case the user denies the request. No reaction from the user may be interpreted as either an acceptance or denial of the request.

The motion, acceleration, velocity, and position signals may be filtered signals, in particular time-filtered signals. It is often advantageous to apply some kind of filtering on measured signals or on signals that are based on measured signals, to reduce the influence of noise and other fluctuations. A skilled person will know applicable filtering methods, such as using an average, a running average, a median filtered signal, etc.

The drawings and plots shown in reference to the example embodiments are schematical drawings and plots, and are not drawn to scale and the axes of the plots may be non-linear.

The skilled person will be able to provide a further functionality allowing turning off of the one or more transceivers if a higher second threshold (in an embodiment independent from determining the first threshold) is exceeded. This could be the situation of a mobile communication device in an airplane. The device and method allow the device to be turned off automatically.

While embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims which follow, the scope of which shall include all equivalents of the subject matter of the claims.

The invention claimed is:

1. A mobile communication device comprising:
a main wireless transceiver unit configured to send and receive wireless signals, the main wireless transceiver unit being configured for voice and data communications over a mobile telephony network;
an additional wireless transceiver unit configured to send and receive wireless signals, the additional wireless transceiver unit being configured to connect to peripheral devices;
a processing unit; and
a motion detection unit, connected to the processing unit and configured to send a motion signal to the processing unit
wherein the processing unit is configured to receive the motion signal and to determine therefrom a parameter representative of a velocity of the mobile communication device, and
the processing unit is configured to turn on the additional wireless transceiver unit when the parameter exceeds a first threshold value.

2. The mobile communication device according to claim 1, wherein the processing unit is configured to turn off the additional wireless transceiver unit when the parameter representative of a velocity remains below a second threshold value for a predetermined period of time.

3. The mobile communication device according to claim 1, wherein the processing unit is configured to send a signal to a user of the mobile communication device prior to turning on the additional wireless transceiver unit.

4. The mobile communication device according to claim 2, wherein the processing unit is configured to send a signal to a user of the mobile communication device prior to turning off the additional wireless transceiver unit.

5. The mobile communication device according to claim 1, wherein the processing unit is configured to request a user of the mobile communication device to accept or deny turning on the additional wireless transceiver unit.

6. The mobile communication device according to claim 1, wherein the processing unit is configured to request a user of the mobile communication device to accept or deny turning off the additional wireless transceiver unit.

7. The mobile communication device according to claim 1, wherein the motion detection unit comprises an accelerometer.

8. The mobile communication device according to claim 1, wherein the motion detection unit comprises a Global Positioning System (GPS) location unit.

9. The mobile communication device according to claim 1, wherein the additional wireless transceiver unit comprises a Bluetooth unit.

10. The mobile communication device according to claim 1, wherein the additional wireless transceiver unit comprises a WiFi unit.

11. The mobile communication device according to claim 1, wherein the first or second threshold value is at least 20 kilometers per hour.

12. The mobile communication device according to claim 1, further comprising:
a microphone unit configured to output a first voice signal;
a speaker unit, and
a coder/decoder (codec) unit, the codec unit being configured to receive the first voice signal from the microphone unit and to generate a coded voice data signal therefrom for sending via the main transceiver unit, the codec unit being configured to receive coded voice data from the main transceiver unit, and to generate therefrom a second voice signal to be rendered on the speaker unit.

13. The mobile communication device according to claim 1, wherein the mobile communication device is configured to function as a mobile telephone.

14. The mobile communication device according to claim 11, wherein the first or second threshold value is at least 30 kilometers per hour or at least 40 kilometers per hour.

15. A method for selectively turning on an additional wireless transceiver unit of a mobile communication device including a main wireless transceiver unit and the additional wireless transceiver unit, the method comprising:
determining a signal indicative of the motion of the mobile communication device;
determining a parameter representative of a velocity of the mobile communication device therefrom; and
turning on the additional wireless transceiver unit when the parameter exceeds a first threshold value,
wherein the main wireless transceiver unit is configured for voice and data communications over a mobile telephony network, and the additional wireless transceiver unit is configured to connect to peripheral devices.

16. The method according to claim 15, further comprising:
turning off the additional wireless transceiver unit when the parameter representative of a velocity remains below a second threshold value for a predetermined amount of time.

17. The method according to claim 15, further comprising:
requesting permission from the user to turn on or turn off the additional wireless transceiver unit; and
cancelling turning on or turning off the additional wireless transceiver unit when the user denies the request.

* * * * *